United States Patent [19]

Yoshida

[11] Patent Number: 4,743,045
[45] Date of Patent: May 10, 1988

[54] ANTIDIVE APPARATUS FOR A VEHICLE

[75] Inventor: Takao Yoshida, Saitama, Japan

[73] Assignee: Honda Giken Kogyo Kabushiki Kaisha, Tokyo, Japan

[21] Appl. No.: 873,816

[22] Filed: Jun. 13, 1986

[30] Foreign Application Priority Data

Jun. 14, 1985 [JP] Japan .................... 60-128006
Jul. 26, 1985 [JP] Japan ................ 60-114961[U]
Jul. 26, 1985 [JP] Japan ................ 60-114965[U]

[51] Int. Cl.$^4$ ............................................. B60G 21/00
[52] U.S. Cl. ...................................... 280/703; 280/276
[58] Field of Search ..................... 280/703, 275, 276

[56] References Cited

U.S. PATENT DOCUMENTS

| | | | |
|---|---|---|---|
| 4,515,384 | 5/1985 | Honma et al. | 280/276 |
| 4,552,373 | 11/1985 | Kawaguchi et al. | 280/703 |
| 4,625,985 | 12/1986 | Nakano et al. | 280/703 |

FOREIGN PATENT DOCUMENTS

| | | | |
|---|---|---|---|
| WO82/00445 | 2/1982 | PCT Int'l Appl. | 280/703 |
| 2128944 | 4/1984 | United Kingdom | 280/703 |

Primary Examiner—John J. Love
Assistant Examiner—Ross Weaver
Attorney, Agent, or Firm—Lyon & Lyon

[57] ABSTRACT

An antidive apparatus for a small vehicle including a telescopic front fork having a damping power generating mechanism and a disc brake apparatus for braking a front wheel associated therewith. The caliper assembly of the disc brake is pivotally supported on the axle of the front wheel and is coupled to an actuator of a contraction motion regulating apparatus of the damping power generating mechanism. In a first embodiment, a connecting rod is pivotally fixed to the lower case, is coupled with the caliper assembly about an eccentric coupling and to the actuator such that the coupling between the caliper assembly and the actuator is effected through the control rod. In another embodiment, the caliper assembly is directly coupled to the actuator with the coupling being closer to the front axle than the caliper cylinders are to the front axle.

4 Claims, 4 Drawing Sheets

ANTIDIVE APPARATUS FOR A VEHICLE

BACKGROUND OF THE INVENTION

The field of the present invention is antidive devices employed with small vehicles to prevent a dipping of the front of the vehicle under braking.

Small vehicles such as motorcycles, motor tricycles and the like typically employ a telescopic front fork assembly with each side including a fork pipe and a bottom case which are mutually slidable in the axial direction as a means for resiliently supporting a front wheel. Under braking, the inertia of the vehicle acts to create forces which cause the front fork to compress and the vehicle to dip or sink. This phenomenon has been recognized and various types of antidive devices have been proposed.

A prior device employed to address the diving phenomenon of such vehicles is described in Japanese Laid Open patent publication No. 58-49587. In this device, brake calipers are supported by a caliper supporting bracket which is rotatably mounted to the front axle and positioned behind the front fork. A portion of the supporting bracket extends forwardly of the front axle. On one of the bottom cases of the front fork, a stay projects forwardly. An L-shaped arm member is pivotally supported by the stay at the intersection of the arms. One of the arms extends downwardly from the pivot adjacent the lower case and is connected to an actuator of a contraction motion regulating apparatus. The other arm of the L-shaped arm member projects forwardly to a rod pinned thereto. The rod is also connected at its other end to the caliper supporting bracket projecting forwardly of the wheel axle. Under braking, a reaction torque acting on the calipers is transmitted to the actuator through the link mechanism consisting of the rod and the L-shaped arm member. The aforementioned antidive apparatus is shown to include a plurality of link members, is relatively complicated and results in relatively high manufacturing costs.

SUMMARY OF THE INVENTION

The present invention is directed to an antidive apparatus for vehicles which controls the damping mechanism of a vehicle suspension. It is the intent of the present invention to reduce the complexity and cost of prior such systems.

The present invention is contemplated for use with telescopic front fork mechanisms having a lower or bottom fork case including a fluid damping system for the vehicle therein. A caliper assembly is pivotally mounted about the front axle of the vehicle such that the reaction force to braking on the caliper assembly causes it to pivot toward the lower case. This movement of the caliper assembly toward the lower case is employed to directly cooperate with the actuator of the fluid damping system within the lower case located at the back side thereof on the vehicle. In a first aspect of the present invention, a lever is pivotally mounted to the rear of the lower case and to the caliper assembly and the damping system actuator in such a way that the actuator moves a greater distance than the caliper assembly in controlling the damping system. In a second aspect of the present invention, the caliper assembly acts directly on the actuator to control the damping system.

Thus, a simplified antidive apparatus is achieved. Other and further objects and advantages will appear hereinafter.

DETAILED DESCRIPTION OF THE PREFERRED EMBODIMENTS

Figure 1:
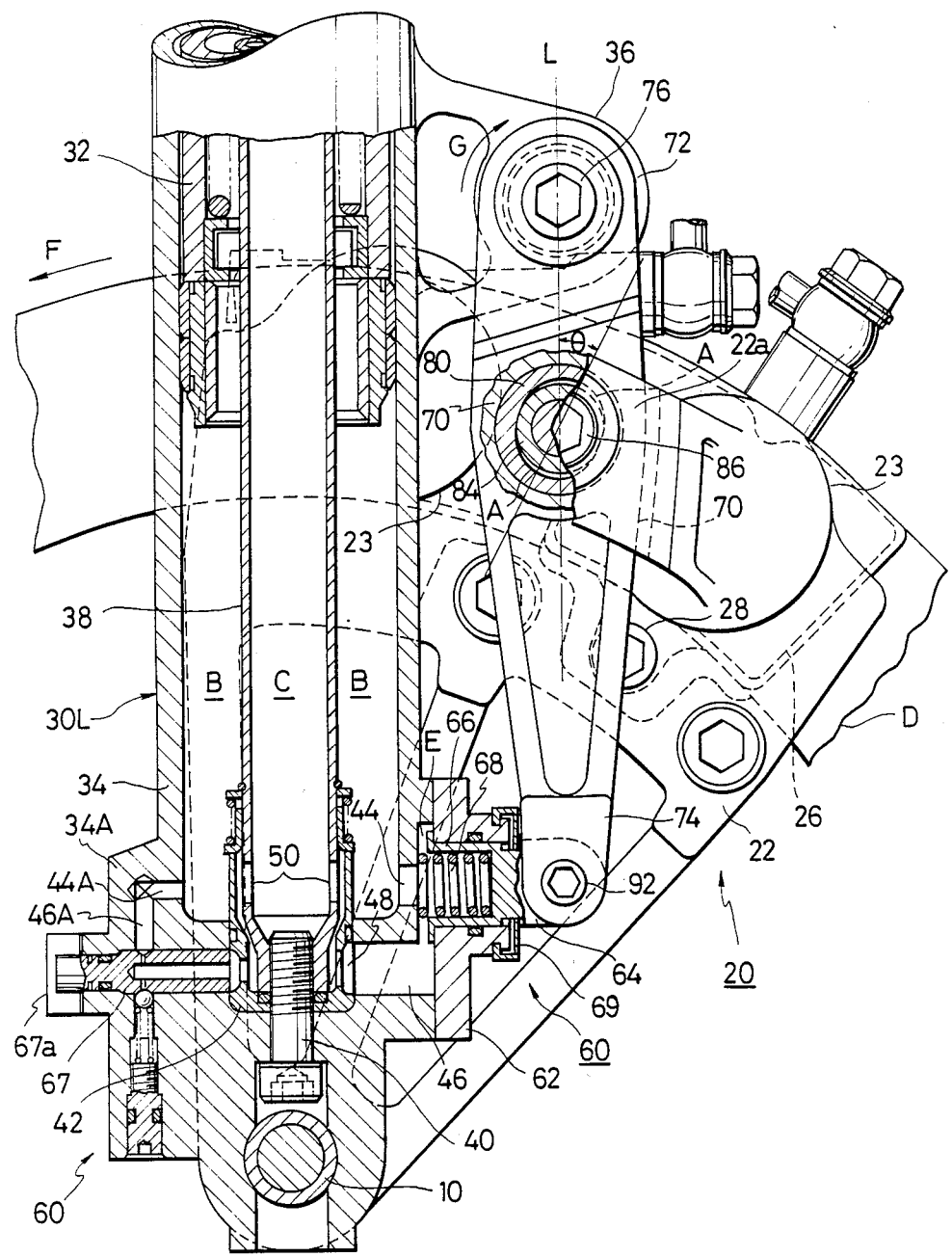
FIG. 1 is a side view, partially in section, of a left side front fork of a motorcycle including an antidive apparatus according to the present invention.
Figure 2:
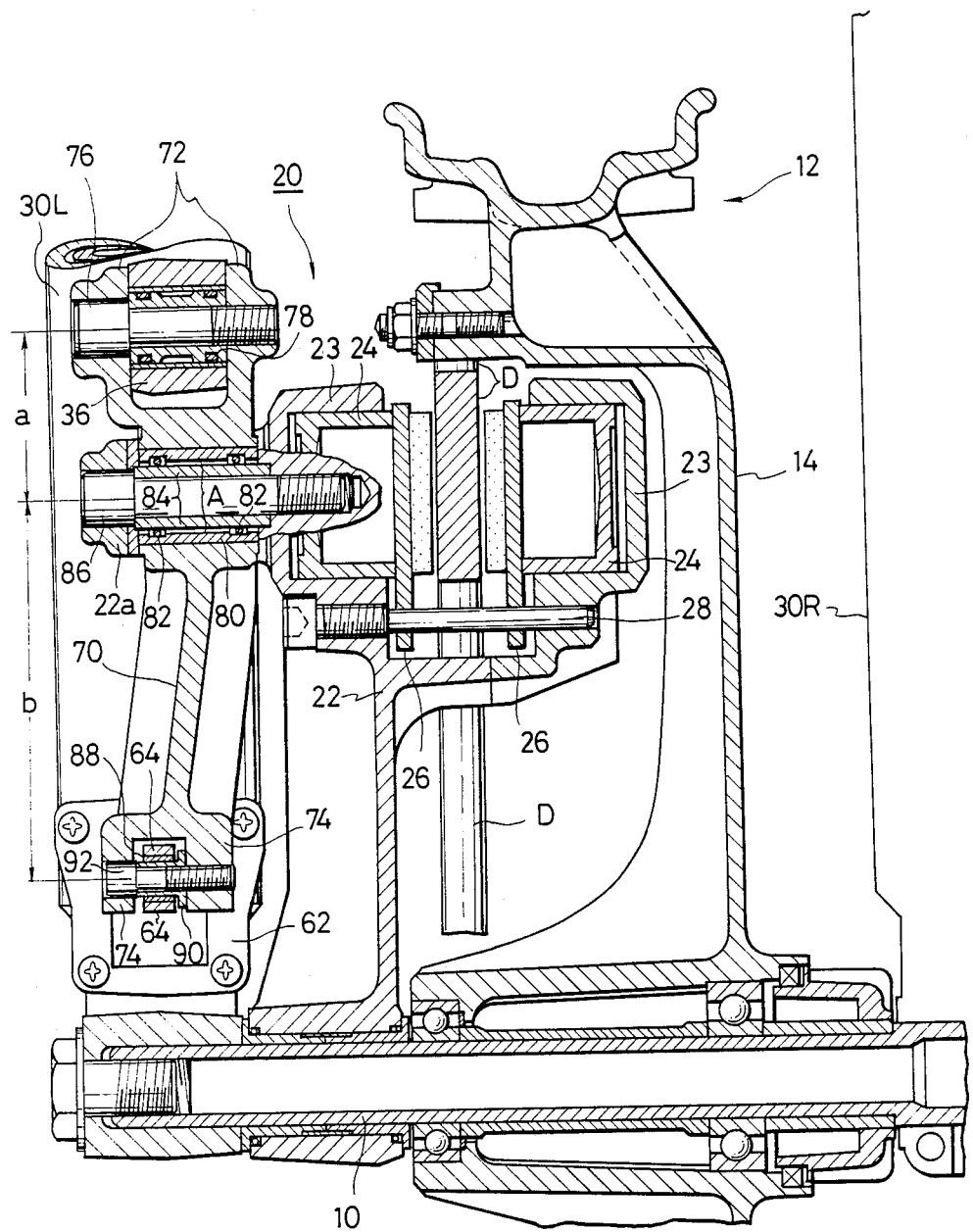
FIG. 2 is a sectional back elevation of the apparatus of FIG. 1.

Turning in detail to the drawings, FIGS. 1 and 2 illustrate a first embodiment of the present invention. The lower front fork portion of a vehicle such as a motorcycle is illustrated particularly showing the front forks 30L and 30R thereof and a contraction motion regulating means or damping system 60 found in the left front fork 30L. A front vehicle wheel axle 10 extends between the left and right front forks 30L and 30R which in turn rotatably supports a wheel hub 14 of a front vehicle wheel 12. A brake disc D is fixed relative to the hub on the left side thereof.

Extending about the brake disc D is a caliper assembly 20 constituting a disc brake apparatus together with the brake disc D. The caliper assembly 20 is an opposed type with a caliper body 22 formed with two units comprising four caliper cylinders 23 into each of which a caliper piston 24 is slidably positoned. Friction pad members 26, retained in position by a hanger pin 28, are controlled by the pistons 24 for clamping and braking the brake disc D.

The caliper body 22 of the caliper assembly 20 extends to the axle 10 at a location between the hub 14 and the left front fork 30L. At this location, the caliper body 22 is pivotally mounted about the axle 10 such that the caliper assembly 20 may pivot to a small extent with the disc D under conditions of braking.

The left and right front forks 30L and 30R are both shown to be of the telescopic types. Only the left front fork 30L is shown to include an antidive device in this embodiment.

The front fork 30L includes a lower case 34 and a fork pipe 32. The case 34 and pipe 32 are telescoped together with the case outermost. The rear outer portion of the lower case 34 includes a projection 36 integrally formed therewith and positioned above the outer periphery of the disc D. Supported on the projection 36 about a pin 76 and a cylindrical element 78 is a connecting rod 70. The upper end portion 72 of the connecting rod 70 is shown to be fork-shaped and positioned to either side of the projection 36. The pin 76 is threadably secured to one end portion of the upper end portion 72 of the connecting rod 70 and retained within the other such that the rod 70 is pinned relative to the projection 36.

The connecting rod 70 is formed at an intermediate portion with a hole therethrough to receive a cylindrical body 80. The cylindrical body 80 has an internal wall of an eliptical configuration as may be seen at A in FIG. 1. The cylindrical body 80 is positioned under pressure within the hole in the rod 70. Positioned within the cylindrical body 80 and sealed by a pair of O-rings 82 is a cylinder 84. Within the cylinder 84 is a shaft member or pin 86 which couples a fork portion 22A of the caliper body 22 with the rod 70. The pin 86 tightly engages the cylinder 84 and is threadably engaged with the caliper body 22 between the caliper cylinders 23.

A lower end portion 74 of the connecting rod 70 is also formed with a fork shape. Disposed between the forked portions is an outer end portion of an actuator 64 coupled with the contraction motion regulating apparatus 60. The outer end portion 64 is formed with an opening into which a cylinder 88 and a flange cylinder 90 are positioned. A pin 92 extending between forked portions and threadably engaged with one of the forked portions retains the cylinders 88 and 90 and the end portion of the actuator 64 in pinned relation with the rod 70. Thus, the rod 70 and actuator 64 form an actuator assembly to couple the caliper assembly 20 the contraction motion regulating apparatus 60.

Looking to the internal structure of the front fork 30L and the contraction motion regulating apparatus 60, a lower end portion of a seat pipe 38 is fixed to an internal lower end of the bottom case 34 by a screw 40. A lower metal element 42 is fixed to a bottom portion of the bottom case 34. An upper end portion of the seat pipe 38 is slidably engaged with the fork pipe 32 and sealed against fluid flow therebetween. Thus, a chamber B is defined by the bottom case 34 and the seat pipe 38 and by the lower end of the fork pipe 32. A chamber C is defined within the interior of the seat pipe 38. Communciation between the chambers B and C is through an opening 44 formed in the bottom case 34, a cylinder chamber E of the contraction motion regulating apparatus 60, a communication path 46 formed in the bottom of the case 34 and opening 48 formed in the metal element 42 and an opening 50 formed in the seat pipe 38.

The contraction motion regulating apparatus 60 is located at the bottom of the case 34. The contraction motion regulating apparatus 60 includes a housing 62 fixed to the back of the bottom case 34 in a fluid-tight arrangement. The housing 62 defines the chamber E. Associated with the housing 62 is an actuator 64. An inner end of the actuator 64 defines a valve member or piston 66. A compression coil spring 68 biases the actuator 64 away from the lower case structure and port 44. A rubber boot 69 cooperates with the actuator 64 to seal the housing 62. On the other side of the lower case 34 is an outwardly protruding portion 34A formed on a front face thereof. Inside the portion 34A an opening 44A and a bypass oil path 46A communicate the chamber B with a regulating orifice member 67 inserted in the bypass oil path 46A. The orifice member 67 has a plurality of orifices of different radii and can be rotated by a grip portion 67a to select the desired orifice. When the antidive piston 66 is forced to abutt against the wall of the lower case 34 at a peripheral portion of the opening 44, the main communication between chambers B and C is cut off. Thus, communication only exists through the selected orifice of the orifice member 67 in the bypass oil path 46A.

With the foregoing construction, when the brake is actuated, the brake disc D, rotating in a direction as indicated by arrow F, is restrained. The torque of the wheel about the axle 10 imposed on the caliper body 22 is transmitted to the connecting rod 70 through the pin 86. This results in the connecting rod 70 being swung in the direction as shown by the arrow G around the pin 76. The actuator 64 connected to the lower end portion 74 of the connecting rod 70 is pushed by the connection through the pin 92 to cause the piston 66 to resist the force of the spring 68 and come into an abutting relationship with the wall of the lower case 34. Consequently, a braking torque produced by the braking between the disc D and the friction pads 26 is transmitted to the projecting element 36 and to the peripheral portion of the opening 44 to form a base upon which the braking force applied to the disc D may be applied.

When the antidive piston 66 progresses forwardly under braking to abut against the wall of the lower case 34, the main oil path through the opening 44, the cylinder chamber E and the communciation path 46 are cut off between the chambers B and C. As a result, the oil more slowly flows into the chamber C under substantial flow path resistance through the selected orifice of the orifices 67. Accordingly, although the fork pipe 32 receives momentum forces tending to cause the front portion of the vehicle to dip or sink under braking, front fork 30L does not allow sudden contraction. Therefore, effective antidive properties are exhibited.

The configuration of the inner wall of the cylinder 80 in an eliptical shape allows the caliper body 22 and the connecting rod 70 to be pivotal about different axes, i.e., pin 76 and front vehicle wheel axle 10, respectively.

The actuation mechanism of the contraction motion regulating apparatus 60 using a single connecting rod 70 is simple in construction and requires only a few number of components compared with conventional such systems. Accordingly, reliability can be improved and manufacturing costs reduced.

Figure 3:
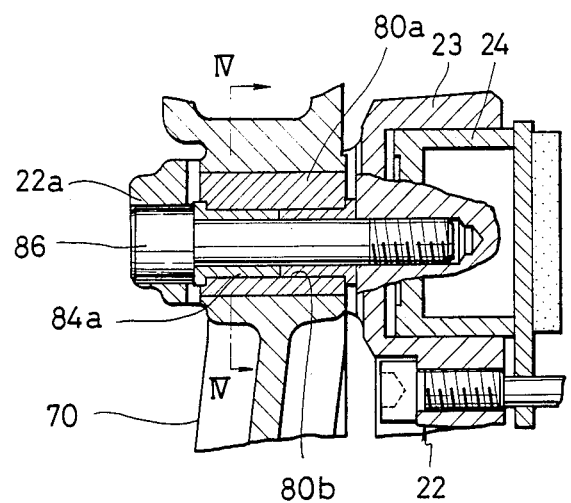
FIG. 3 is a cross-sectional view of a second embodiment of the connecting portion between the connecting rod and the caliper assembly.
Figure 4:
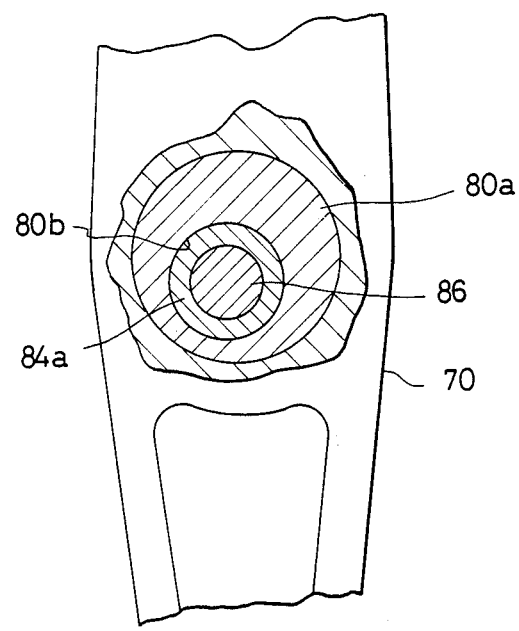
FIG. 4 is a cross-sectional view taken along line IV—IV of FIG. 3.

FIGS. 3 and 4 illustrate a second embodiment showing a change only in the connecting portion between the connecting rod 70 and the caliper body 22. Identical reference numerals are employed where similar parts are used between the first and second embodiments. In this second embodiment, the connecting rod 70 is formed at its intermediate portion with an opening into which a circular cylinder 80a is located. The cylinder 80a has an eccentric circular hole 80b. The circular cylinder 80a may be rotated to vary the location of the centerline thereof. Rotatably inserted into the circular hole 80b is a flange cylinder 84a. As described in the foregoing, the pin 86 extending through the arm member 22a of the caliper body 22 is threadedly engaged with the caliper body 22 between the caliper cylinders 23. The pin 86 tightly engages the cylinders 84a. With this construction, the connecting rod 70 can be swung about the pin 76 and the caliper body 22 can be swung about the vehicle wheel axle 10, respectively.

Figure 5:
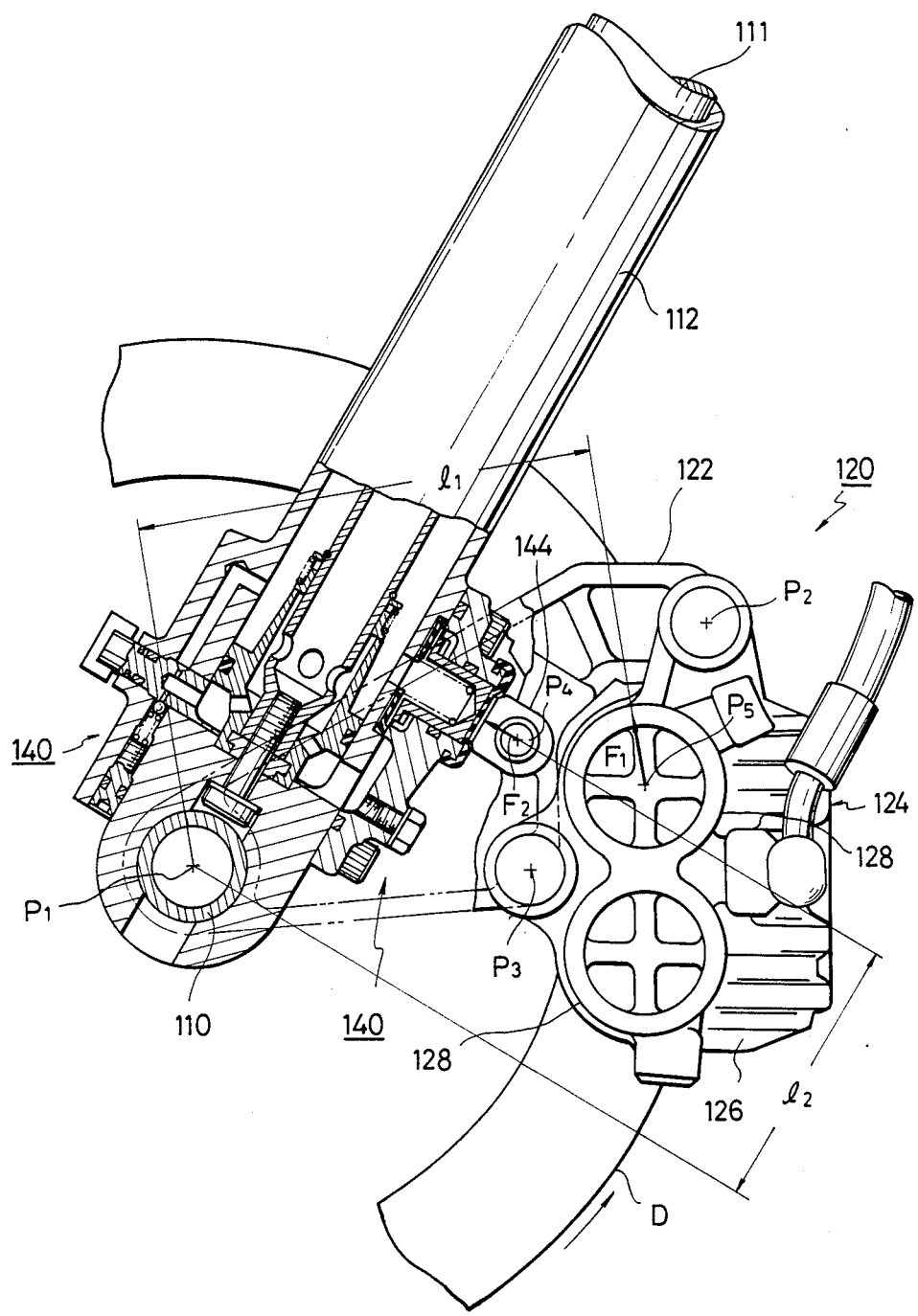
FIG. 5 is a side view, partially in section, showing another embodiment of the present invention.

FIG. 5 illustrates yet another embodiment of the present invention. This embodiment also includes a front fork comprising a fork pipe 111 and a lower case 112. The lower case 112 includes a contraction motion regulating appratus 60 as in the preceding embodiments. A caliper body 126 of a caliper assembly 124 is associated with a brake disc D to provide a disc brake system 120. A caliper support bracket 122 supports the caliper body 126 at points $P_2$ and $P_3$. The caliper support bracket 122 is pivotally supported by the front vehicle wheel axle 110 at point $P_1$. The caliper body 126 is integrally formed with the cylinders 128. At a location nearer to the front wheel axle 110 than the center $P_5$ of one of the caliper cylinders 128, an actuator 144 of the contraction motion regulating apparatus 140 is connected to the caliper support bracket 122. A rotary force $F_1$ (the point $P_5$ is referred to as the point of action for convenience) of the caliper 124 is produced around the front vehicle wheel axle 110 when braking is effected. A force $F_2$ is transmitted to the actuation piece 144 of the contraction motion regulating apparatus 140 from the caliper supporting member 122 at the connecting point $P_4$ to push in the actuator piece 144 under braking conditions. As a result, the antidive effect is obtained in a manner as described in the foregoing.

The relation between forces $F_2$ and $F_1$ is given by the formula $F_2 = F_1 (L_1/L_2)$. Since $L_1 > L_2$, it becomes $F_2 > F_1$. This means that a large force can be imposed on the actuator 144 of the contraction motion regulating apparatus 140 in this embodiment. Furthermore, this embodiment is even more simplified than the preceding embodiments. Thus, the number of component parts can be reduced even further and the unsprung weight of the vehicle is advantaged.

Thus, improved antidive devices are disclosed which provide simplified and advantageous construction. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An antidive apparatus for a vehicle including a telescopic front fork having a lower case containing a fluid damper and a front axle mounted to the front fork, comprising:
   a brake caliper assembly pivotally mounted about said front axle and positioned rearwardly of said front fork;
   an actuator assembly extending rearwardly from said front fork including an actuator in said fluid damper to control damping flow and a connecting rod pivotally connected at one end to said case and at the other end of said actuator; and
   means intermediate said ends of said connecting rod for coupling said connecting rod to said brake caliper assembly, said coupling means including a pin mounted in one of said brake caliper assembly and said connecting rod and a cylindrical bore in the other thereof for receiving said pin, and an intermediate elliptical cylindrical member between said pin and said cylindrical bore.

2. An antidive apparatus for a vehicle including a telescopic front fork having a lower case containing a fluid damper and a front axle mounted to the front fork, comprising:
   a brake caliper assembly pivotally mounted about said front axle and positioned rearwardly of said front fork;
   an actuator assembly extending rearwadly from said front fork including an actuator in said fluid damper to control damping flow and a connecting rod pivotally connected at one end to said case and at the other end to said actuator; and
   means intermediate said ends of said connecting rod for coupling said connecting rod to said brake caliper assembly including a pin mounted in one of said brake caliper assembly and said connecting rod and disposed in a cylindrical bore in the other thereof, and a cylindrical member having an eccentric bore therethrough positioned between said pin and said cylindrical bore.

3. An antidive apparatus for a small vehicle including a telescopic front fork comprising a fork pipe and a bottom case slidably engaged with respect to each other and having a hydraulic damping powe generating mechanism, a contraction motion regulating apparatus provided on the front fork and adapted to regulate the contraction motion of the front fork by cutting off a main communication fluid path of the damping power generating mechanism when braking is effected, and a disc brake apparatus for braking a front wheel, whereby a caliper of said disc brake apparatus is swingably supported on a front vehicle wheel axle, a projecting piece being formed on a rear face of the bottom case and a connecting rod swingable in the forward and backward direction in the vehicle being pinned at a first end to said projecting piece, said connecting rod being connected at its intermediate portion with said caliper through a shaft member and at its other end to an actuator of said contraction motion regulating apparatus, and
   a cylindrical body having a shaft hole of an elliptical configuration and section fixed to an intermediate portion of said connecting rod in such manner as to permit the same to penetrate said connecting rod in the transverse direction, said shaft hole being engaged with said shaft member of a circular configuration in section.

4. An antidive apparatus for a small vehicle including a telescopic front fork comprising a fork pipe and a bottom case slidably engaged with respect to each other and having a hydraulic damping power generating mechanism, a contraction motion regulating apparatus provided on the front fork and adapted to regulate the contraction motion of the front fork by cutting off a main communication fluid path of the damping power generating mechanism when braking is effected, and a disc brake apparatus for braking a front wheel, whereby a caliper of said disc brake apparatus is swingably supported on a front vehicle wheel axle, a projecting piece being formed on a rear face of the bottom case and a connecting rod being pinned at a first end to said projecting piece swingably in the forward and backward direction on the vehicle, said connecting rod being connected at its intermediate portion with said caliper through a shaft member and at its other end to an actuator of said contraction motion regulating apparatus, and
   a cylindrical body having an eccentric shaft hole pivotally fixed to an intermediate portion of said connecting rod in such manner as to permit the same to penetrate said connecting rod in the transverse direction, said eccentric shaft hole being engaged with said shaft member.

* * * * *